Patented June 27, 1939

2,163,913

UNITED STATES PATENT OFFICE 2,163,913

FOOD COMPOSITION

Theodore John Otterbacher, Zion, Ill., assignor to Corn Products Refining Company, New York, N. Y., a corporation of New Jersey No Drawing. Application July 18, 1938, Serial No. 219,909

2 Claims. (Cl. 99—139)

This invention relates to edible sugar containing coatings or fillings for cakes, biscuits, wafers and the like, more particularly to a coating or filling compound which, though containing also fat or other greasy substance as an ingredient thereof, possesses a less greasy flavor, a better plastic flow, a better color and other desirable characteristics that will hereinafter more fully appear. The invention comprises, in brief, the utilization of destarched corn gluten as an ingredient of the coating. It has been found that destarched gluten will cut the excessive greasy taste and impart a natural yellow color to coatings of this nature, as well as giving a mechanically better running quality. Furthermore the presence of destarched corn gluten renders the product less susceptible to temperature variations and, therefore, makes for greater stability.

By the term "destarched corn gluten" is meant ordinary corn gluten from which the residual carbohydrate content has been removed by enzymic action or acid hydrolysis. Ordinary gluten is unsuitable for food products of this character for the reason that the contained impurities (degradation products) would impart undesirable characteristics to the finished product.

The following example, which is purely informative and not by way of limitation of the invention, illustrates the manner in which the present invention may be carried out.

Example

| | Parts |
|---|---|
| Pulverized dextrose | 32 |
| Pulverized sucrose | 32 |
| Melted hard fat | 32 |
| Destarched corn gluten | 4 |
| Salt | 0.4 |
| Vanillin | 0.1 |

The above ingredients are mixed together in a beater until proper plasticity is obtained. The resulting material when applied to base cakes or sugar wafer shells or when used as a sandwich filling gives a product which is free from the excessive greasy taste and has a natural yellow color. In applying the material to the food product it will also be found that it has an improved plastic flow. The gluten also acts as a stabilizing agent in that it maintains the sugar particles in a higher degree of dispersion.

The above example is subject to wide variations to suit manufacturing conditions. If it is desired to eliminate the color effect, the destarched gluten may be first decolorized.

The term "icing" as used in the appended claims is employed in a broad sense to include not only a material used as a coating or frosting, but also similar material employed as a filling, for example, for bakery products of the sandwich type.

It is intended to cover all variations and modifications within the scope of the appended claims. However, no claim is made herein to the use of destarched gluten in food products of the bakery goods type as disclosed in applicant's co-pending application, Serial No. 219,911, filed July 18, 1938; the present application being limited to sugar containing products.

I claim:

1. A grease-containing icing for application to food products containing, as ingredients thereof, destarched corn gluten and sugar.

2. An icing for food compositions containing, in substantially the proportions set forth, dextrose 32 parts, sucrose 32 parts, fat 32 parts, destarched corn gluten 4 parts, and other flavoring material 0.5 part.

THEODORE JOHN OTTERBACHER.